(12) United States Patent
Gong et al.

(10) Patent No.: US 10,509,685 B2
(45) Date of Patent: Dec. 17, 2019

(54) METHODS, SYSTEMS, AND COMPUTER READABLE MEDIUMS FOR WORKLOAD CLUSTERING

(71) Applicant: VCE COMPANY, LLC, Richardson, TX (US)

(72) Inventors: Changbin Gong, Sherborn, MA (US); Volodymyr Korolyov, Cork (IE)

(73) Assignee: VCE IP Holding Company, LLC, Richardson, TX (US)

( * ) Notice: Subject to any disclaimer, the term of this patent is extended or adjusted under 35 U.S.C. 154(b) by 0 days.

(21) Appl. No.: 14/915,514

(22) PCT Filed: Dec. 14, 2015

(86) PCT No.: PCT/UA2015/000124
§ 371 (c)(1),
(2) Date: Feb. 29, 2016

(87) PCT Pub. No.: WO2017/105376
PCT Pub. Date: Jun. 22, 2017

(65) Prior Publication Data
US 2018/0276050 A1 Sep. 27, 2018

(51) Int. Cl.
*G06F 9/455* (2018.01)
*G06F 9/50* (2006.01)
*G06N 20/00* (2019.01)

(52) U.S. Cl.
CPC ........ *G06F 9/5083* (2013.01); *G06F 9/45558* (2013.01); *G06F 9/5077* (2013.01);
(Continued)

(58) Field of Classification Search
CPC .. G06F 9/5083; G06F 9/5077; G06F 9/45558; G06F 9/4843; G06F 9/4856; G06F 9/4881; G06F 9/50; G06F 9/5005; G06F 9/5011; G06F 9/5016; G06F 9/5061; G06F 9/5066; G06F 9/5072; G06N 3/08; G06N 99/005
See application file for complete search history.

(56) References Cited

U.S. PATENT DOCUMENTS 6,944,622 B1 * 9/2005 Mitchell ............... G06Q 10/103
7,499,908 B2 3/2009 Elnaffar et al.
(Continued)

OTHER PUBLICATIONS

Menasce et al., "A Methodology for Workload Characterization of E-commerce Sites", 1999 ACM1-58113-176-3/99/0011, (NPL: Menasce_1999.pdf; pp. 1-10) (Year: 1999).*
(Continued)

*Primary Examiner* — Hiren P Patel
(74) *Attorney, Agent, or Firm* — Jenkins, Wilson, Taylor & Hunt P.A.

(57) ABSTRACT

Methods, systems, and computer readable mediums for optimizing a system configuration are disclosed. In some examples, a method includes determining whether a system configuration for executing a workload using a distributed computer system is optimizable and in response to determining that the system configuration is optimizable, modifying the system configuration such that at least one storage resource for storing workload data is located at a server node that is executing the workload in the distributed computer system.

14 Claims, 5 Drawing Sheets

(52) U.S. Cl.
CPC ..... *G06N 20/00* (2019.01); *G06F 2009/4557* (2013.01); *G06F 2009/45575* (2013.01)

(56) References Cited

U.S. PATENT DOCUMENTS

| | | | | |
|---|---|---|---|---|
| 8,156,502 | B1* | 4/2012 | Blanding | G06F 9/50 718/100 |
| 8,478,878 | B2* | 7/2013 | Freimuth | G06F 9/45558 709/223 |
| 8,645,425 | B1* | 2/2014 | Brown | G06F 17/30306 707/788 |
| 8,924,961 | B2* | 12/2014 | Radhakrishnan | G06F 9/5055 718/1 |
| 9,116,803 | B1* | 8/2015 | Agrawal | G06F 11/0751 |
| 9,235,802 | B1* | 1/2016 | Chamness | G06F 11/08 |
| 10,025,611 | B2* | 7/2018 | Figueroa | G06F 9/45558 |
| 10,146,636 | B1* | 12/2018 | Ghare | G06F 11/3688 |
| 2006/0277549 | A1* | 12/2006 | Li | G06F 9/4812 718/104 |
| 2008/0148272 | A1* | 6/2008 | Yoshida | G06F 9/505 718/104 |
| 2008/0172419 | A1 | 7/2008 | Richards et al. | |
| 2009/0103933 | A1* | 4/2009 | Miyazaki | G03G 21/1892 399/12 |
| 2009/0132536 | A1* | 5/2009 | Brown | G06F 9/5083 |
| 2009/0228579 | A1* | 9/2009 | Sanghvi | H04L 41/0843 709/224 |
| 2011/0145241 | A1* | 6/2011 | Mehrotra | G06F 9/5061 707/737 |
| 2011/0224816 | A1* | 9/2011 | Pereira | G05B 19/41865 700/100 |
| 2012/0101968 | A1* | 4/2012 | Banerjee | H04L 41/0823 706/21 |
| 2012/0110584 | A1* | 5/2012 | Chaudhry | G06F 9/5027 718/102 |
| 2013/0111468 | A1* | 5/2013 | Davis | G06F 9/5077 718/1 |
| 2013/0185729 | A1 | 7/2013 | Vasic et al. | |
| 2013/0212279 | A1* | 8/2013 | Dutta | G06F 9/5061 709/226 |
| 2013/0226922 | A1* | 8/2013 | Labenski | G06F 16/35 707/737 |
| 2013/0311409 | A1* | 11/2013 | Ye | G06N 99/005 706/12 |
| 2013/0346994 | A1* | 12/2013 | Chen | G06F 9/5044 718/104 |
| 2014/0196034 | A1* | 7/2014 | Amano | G06F 9/45533 718/1 |
| 2015/0007173 | A1* | 1/2015 | Ionescu | G06F 9/45533 718/1 |
| 2015/0261573 | A1* | 9/2015 | Rausch | G06F 16/248 718/106 |
| 2015/0261576 | A1* | 9/2015 | Gong | G06F 9/5016 711/6 |
| 2015/0331733 | A1* | 11/2015 | Channagiri | G06F 11/079 714/33 |
| 2015/0378861 | A1* | 12/2015 | Deshpande | G06F 11/3409 717/131 |
| 2016/0026506 | A1* | 1/2016 | Jiang | G06F 9/5088 718/104 |
| 2016/0034306 | A1* | 2/2016 | Galdy | G06F 9/5011 718/104 |
| 2016/0285966 | A1* | 9/2016 | Brech | H04L 41/0893 |
| 2016/0294722 | A1* | 10/2016 | Bhatia | H04L 47/70 |
| 2016/0337226 | A1* | 11/2016 | Padala | H04L 43/10 |
| 2016/0364265 | A1* | 12/2016 | Cao | G06F 9/4818 |
| 2017/0116038 | A1* | 4/2017 | Netto | G06F 9/4881 |
| 2017/0147816 | A1* | 5/2017 | Schilling | G06F 21/56 |
| 2017/0163661 | A1* | 6/2017 | Lazri | G06F 21/552 |
| 2017/0177995 | A1* | 6/2017 | Hillar | G06N 3/08 |

OTHER PUBLICATIONS

Notification of Transmittal of the International Search Report and the Written Opinion of the International Searching Authority, or the Declaration for International Application No. PCT/UA2015/000124 (dated May 26, 2016).

"Determining the number of clusters in a data set," Wikipedia, p. 1-6, (Nov. 24, 2015).

"k-means clustering," Wikipedia, p. 1-12, (Nov. 24, 2015).

* cited by examiner

| CLUSTER ID | WEB SERVICES | DATABASE SERVICES | VM MANAGEMENT SERVICES | REMOTE SERVICES |
|---|---|---|---|---|
| 1 | 1 | 1 | 14 | 0 |
| 2 | 164 | 1 | 2 | 14 |
| 3 | 0 | 56 | 4 | 0 |
| 4 | 0 | 0 | 0 | 35 |
| 5 | 2 | 0 | 0 | 6 |

400

US 10,509,685 B2

METHODS, SYSTEMS, AND COMPUTER READABLE MEDIUMS FOR WORKLOAD CLUSTERING

TECHNICAL FIELD

This specification relates generally to workload clustering, e.g., by identifying similar workloads using a machine-learning algorithm and grouping them into clusters for various purposes, such as efficient workload management and/or virtual machine (VM) configuration management.

BACKGROUND

In a distributed computer system, a computer system can include a number of computing devices, e.g., server nodes with processors and networking capability. Physical storage resources (e.g., storage devices, hard drives, memory chips, or spindles) can be integrated with the computing devices and therefore distributed throughout the computer system. Software-defined storage management software can create and manage storage pools including the distributed storage resources, where the storage pools are used by one or more computing devices in the computer system to execute workloads (e.g., processing stored data, executing virtual machines (VMs), or other tasks). However, as the number of workloads increase on a distributed computing system, it becomes increasingly desirable to manage workloads and/or related VMs in an orderly and efficient manner.

SUMMARY

This specification describes methods, systems, and computer readable mediums for workload clustering. In some examples, a method includes identifying at least one workload cluster using a machine-learning algorithm, wherein the machine-learning algorithm uses characteristics of a plurality of workloads for identifying the at least one workload cluster and managing the at least one workload cluster, wherein managing the at least one workload cluster includes initiating an action that is to be performed with regard to each workload in the at least one workload cluster.

BRIEF DESCRIPTION OF THE DRAWINGS

The subject matter described herein will now be explained with reference to the accompanying drawings of which.

DETAILED DESCRIPTION

When a distributed computing system implements a substantial number of workloads (e.g., virtual machines and/or virtualization containers), efficient workload management may be very desirable to a system operator or other user. For example, a system operator may prefer to manage multiple workloads at the same time, especially if these workloads are similar, thereby saving time and increasing efficiency. However, typical workload management techniques generally require a system operator to manage workloads individually or to manually select a group of workloads for management using preconfigured names or tags or using selected metrics.

The systems, methods, and computer readable mediums described in this specification can be used for aspects associated with workload clustering. For example, one or more methods, techniques, mechanisms, and/or devices may involve using one or more machine-learning algorithms for associating workloads into workload clusters, where each workload cluster may represent one or more similar workloads that can be managed efficiently as a group. In this example, the one or more machine-learning algorithms (e.g., a k-means clustering algorithm and/or other clustering algorithms) may use workload related characteristics, such as processing usage, memory usage, and operating system type, and a predictive data model for associating similar workloads into workload clusters.

By using one or more machine-learning algorithms for identifying workload clusters, workload management, VM configuration, and/or other related tasks may be performed more quickly and more efficiently. For example, a system operator may only need to perform a management action for a workload cluster to generate management actions for each workload within the workload cluster, instead of trying to manage hundreds or even thousands of workloads individually or trying to manually group such workloads into management groups.

Figure 1:
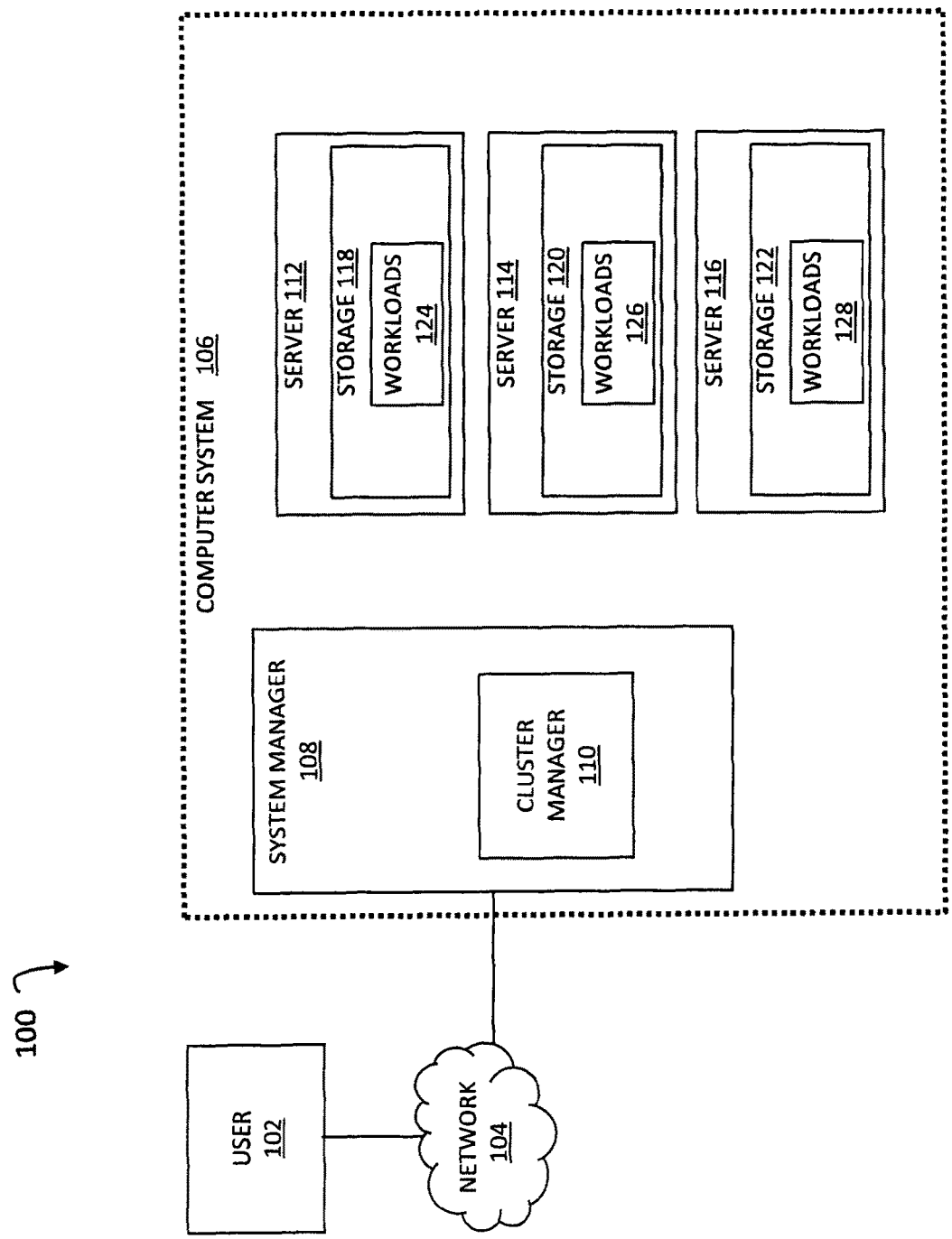
FIG. 1 is a block diagram illustrating a computer environment according to an embodiment of the subject matter described herein.

FIG. 1 is a block diagram illustrating a computer environment 100 according to an embodiment of the subject matter described herein. Computer environment 100 includes a user 102, a network 104, and a computer system 106. User 102 may represent a human operator, a user device, or other entity (e.g., a client node) for interacting with computer system 106. In some embodiments, network 104 may represent the Internet or a communications network for facilitating communications between user 102 and computer system 106 or portions thereof.

Computer system 106 may include a system manager 108 and server nodes 112, 114, and 116. For example, computer system 106 may represent a distributed computer system, such as a hyper-converged system or a converged system, implemented using server nodes 112, 114, and 116, where each server node interacts with each other via network 104 and/or another network. In this example, the components or resources associated with computer system 106 may communicate or interact with one another and/or other entities (e.g., user 102) using one or more communications protocols (e.g., Internet protocol (IP) or Ethernet).

Server nodes 112, 114, and 116 may include computer systems that include physical components for data processing, data storage, and data communication. For example, server nodes 112 can include one or more physical storages (e.g., hard drives, flash drives, and/or storage devices) integrated with at least one compute component (e.g., a physical processor, an application-specific integrated circuit (ASIC), and/or a field-programmable gate array (FPGA)). In this example, a physical storage may include one or more physical storage resources (e.g., a non-transitory computer readable medium, a hard drive, a flash drive, a memory device, and/or a storage device) for storing data.

Physical storages 118, 120, and 122 may be integrated with server nodes 112, 114, and 116, respectively, to create a distributed storage system, e.g., by virtue of software that implements the storage application executing on the same one or more processors that run distributed computing applications. In some embodiments, computer system 106 may include physical storages that are not integrated with compute nodes, in addition to server nodes 112, 114, and 116.

In some embodiments, server nodes 112, 114, and 116 and/or physical storages 118, 120, and 122 may be associated with equipment racks and/or chassis. For example, a first equipment rack may be located in a first geographical location and may include a number of chassis and each chassis may include one or more server nodes. In this example, a second equipment rack may be located in a second geographical location different from the first geographical location and may include a number of chassis and each chassis may include one or more server nodes.

System manager 108 may include a computer system comprising one or more computers configured, by virtue of appropriate programming, to perform virtualization using server nodes 112, 114, and 116. Performing virtualization may include abstracting software and/or hardware components and presenting the abstraction as a new logical entity, or sharing physical resources between multiple isolated services.

System manager 108 can be configured to distribute various computing tasks or workloads, such as workloads 124, 126, and 128, across server nodes 112, 114, and 116. For example, workloads 124 may include one or more VM instances and/or virtualization containers, e.g., a logical package containing an application and/or a framework with all of its dependencies. In this example, each of workloads 124 may perform various services or functions, such as web services, database services, VM management services, and/or remote services.

System manager 108 can be configured to store data across server nodes 112, 114, and 116. System manager 108 may establish storage pools (e.g., logical pools of data storage) using physical storages 118, 120, and 122 and may present a storage pool to an application executing in computer system 106 as a single logical storage volume. System manager 108 may also be configured to mirror and/or move data across physical storages. For example, system manager 108 can be configured so that, when an application writes to a storage pool, data that is written to particular physical storage is also written to an assigned mirror storage node.

System manager 108 can include or communicate with a cluster manager 110. Cluster manager 110 can represent any suitable entity (e.g., software executing on one or more computers, a stand-alone device, etc.) for performing aspects of workload clustering and/or related workload cluster management. For example, cluster manager 110 may identify or group one or more workloads into a workload cluster. In this example, cluster manager 110 may also include functionality for managing a workload cluster, e.g., initiating actions that are to be performed with regard to each workload within the workload cluster.

In some embodiments, cluster manager 110 can be configured to access information about server nodes 112, 114, and 116, VMs, workloads, and/or other entities via an application programming interface (API) or other interface. For example, cluster manager 110 may identify or obtained information from system manager 108 and/or other components, systems, and/or entities via multiple communications interfaces. In this example, cluster manager 110 may use the obtained data (e.g. workload and/or VM related characteristics) for various purposes, e.g., determining an appropriate number of workload clusters, assigning workloads to a workload clusters, and/or verifying cluster assignments.

In some embodiments, cluster manager 110 may configure, train, and use one or more machine-learning algorithms or related predictive data model(s) for workload clustering. For example, cluster manager 110 may use a machine-learning algorithm, such as a k-means clustering algorithm, for grouping one or more workloads into a workload cluster. In this example, the machine-learning algorithm may use historical workload information, such as characteristics related to previous workloads and related cluster assignments, for improving a related predictive data model that can identify workload clusters and/or assign workloads to the identified workload clusters.

In some embodiments, cluster manager 110 can execute one or more machine-learning algorithms repeatedly. For example, a machine-learning algorithm may utilize one or more input parameters (e.g., initialization variables), where each input parameter can affect workload clustering. In this example, cluster manager 110 may execute a machine-learning algorithm one or more times, where cluster manager 110 uses different input parameters each time a machine-learning algorithm is executed.

In some embodiments, cluster manager 110 can utilize predetermined information, historical information, dynamic information, and/or various algorithms or techniques for configuring a machine-learning algorithm and its input parameters. For example, a machine-learning algorithm may include an input parameter indicating a number of potential workload clusters for workload assignments. In this example, the number of potential workload clusters may be determined based on a formula (e.g., a total amount of workloads divided by 2), based on a previous used value, based on workload related characteristics (e.g., based on the number of different types of operating systems (OSs) utilized in a set of workloads) or based on an elbow method (e.g., the number of workload clusters increases percentage of variance for the clustered data less than a certain threshold, e.g., less than 15%).

In some embodiments, a machine-learning algorithm can include one or more clustering algorithms, such as a k-means clustering algorithm, a k-medians clustering algorithm, and/or an x-means clustering algorithm. For example, a clustering algorithm may use workload related characteristics to group similar workloads into workload clusters. In this example, workload related characteristics may include information about a number of processing cores utilized, information about memory utilized, and information about an OS utilized.

In some embodiments, cluster manager 110 may manage at least one workload cluster. For example, cluster manager 110 may provide a user interface (e.g., an API or a graphical user interface (GUI)) for allowing a user 102 to select various options, configurations, and/or other actions related to a workload cluster. In this example, a selected action may trigger a corresponding action for each workload in a workload cluster.

In some embodiments, cluster manager 110 may provide a user interface that is customized based on a workload cluster and/or workloads therein. For example, assuming a first workload cluster is associated with workloads that perform database services, a management user interface may provide selectable actions related to database services. In another example, assuming a second workload cluster is associated with workloads that perform web services, a management user interface may provide selectable actions related to web services.

Although FIG. 1 illustrates an example computer system 106, the systems, methods, and computer readable mediums described in this specification can be used in any appropriate distributed computing system. In general, an appropriate distributed computing system implements any number of workloads that can be clustered or grouped into one or more workload clusters.

It will be appreciated that FIG. 1 is for illustrative purposes and that various components, their locations, and/or their functions as described above in relation to FIG. 1 can be changed, altered, added, or removed. Further, aspects of the disclosed subject matter (e.g., cluster manager 110) can be implemented and/or located on any computing system or components therein.

Figure 2:
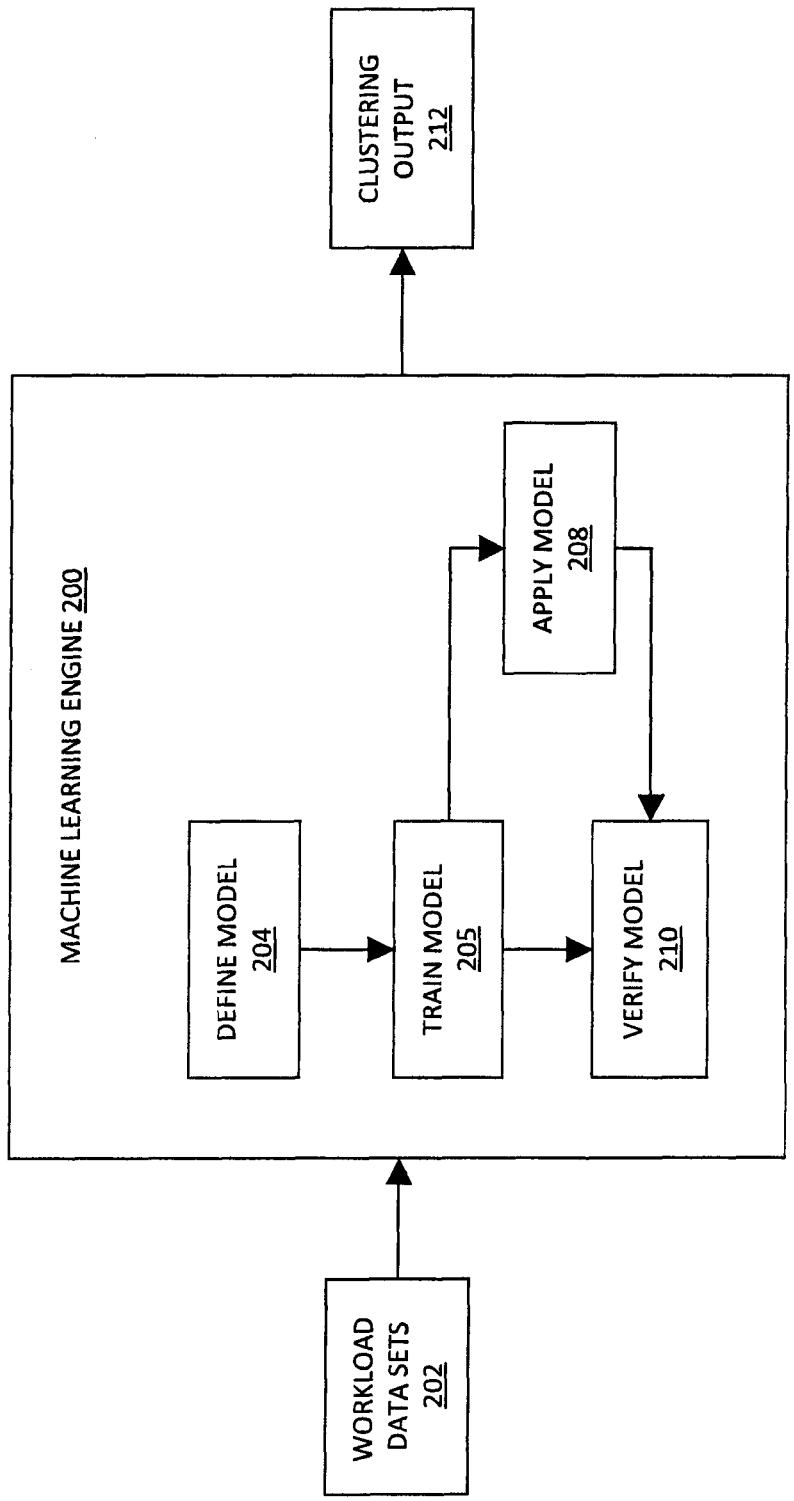
FIG. 2 is a diagram illustrating a machine-learning engine according to an embodiment of the subject matter described herein.

FIG. 2 is a diagram illustrating a machine-learning engine 200 according to an embodiment of the subject matter described herein. Machine-learning engine 200 may represent any suitable entity (e.g., software executing on or more processors or computers) for performing one or more machine-learning algorithms. In some embodiments, machine-learning engine 200 may be implemented using cluster manager 110 or other entities in computer system 106 and/or may communicate with cluster manager 110 or other entities in computer system 106.

In some embodiments, machine-learning engine 200 can be configured for performing cluster analysis. Cluster analysis may involve assigning a set of workloads into subsets (called clusters), where workloads within a same cluster are similar according to some predesignated criterion or criteria (e.g., workload related characteristics, such as OS type, memory usage, and processing usage), For example, machine-learning engine 200 may identify all Linux based VMs as a first workload cluster and may identify all Windows based VMs as a second workload cluster. In another example, machine-learning engine 200 may identify all VMs allocated four gigabytes (GBs) of random access memory (RAM) and six processing cores as a first workload cluster and may identify all VMs allocated 8 GBs of RAM and eight or more processing cores as a second workload cluster.

In some embodiments, machine-learning engine 200 can perform one or more clustering algorithms, such as a k-means clustering algorithm, a k-medians clustering algorithm, an x-means clustering algorithm, etc. Some clustering algorithms may make various assumptions on the data (e.g., workload related characteristics) used for clustering, and may assume some similarity metric(s) that can be expressed or evaluated, e.g., by internal compactness of a cluster (e.g., similarity between members of a same cluster) and separation between different clusters. Other clustering algorithms may be based on estimated density and/or graph connectivity.

In some embodiments, machine-learning engine 200 may perform or utilize supervised learning techniques. Supervised learning techniques may involve machine-learning engine 200 or a related machine-learning algorithm receiving and utilizing labeled or structured training data. For example, using supervised learning, workload data sets 202 may be provided to machine-learning engine 200 and machine-learning engine 200 may classify or group various workloads as being similar for workload clustering purposes using characteristics indicated by workload data sets 202. In this example, workload data sets 202 may include workload related characteristics for a set of workloads and may also include user provided information (e.g., metadata, user-selected cluster assignments for the workloads, the relative importance of certain workload related characteristics, etc.) usable by machine-learning engine 200 to identify patterns, rules, or appropriate clustering behavior.

In some embodiments, machine-learning engine 200 can perform or utilize unsupervised learning techniques. Unsupervised learning techniques may involve machine-learning engine 200 or a related machine-learning algorithm identifying structure (e.g., rules for a predictive data model) in unlabeled training data. For example, using unsupervised learning, workload data sets 202 may be provided to machine-learning engine 200 and machine-learning engine 200 may classify or group various characteristics as being similar for workload clustering purposes. In this example, workload data sets 202 may include workload related characteristics for a set of workloads, but may not include user provided information (e.g., metadata, e.g., user-selected cluster assignments for the workloads, the relative importance of certain workload related characteristics, etc.) usable by machine-learning engine 200 to identify patterns, rules, or appropriate clustering behavior. Instead, machine-learning engine 200 may identify patterns, rules, or appropriate clustering behavior without this user provided information.

In some embodiments, machine-learning engine 200 may perform various machine-learning tasks and/or related techniques. For example, machine-learning engine 200 may involve a define model task 204, a train model task 206, an apply model task 208, and a verify model task 210. In this example, the various machine-learning tasks may involve defining, training, applying, and verifying a predictive data model for assigning workloads into workload clusters.

Define model task 204 may involve defining or creating a predictive data model associated with performing cluster analysis. In some embodiments, define model task 204 may involve defining a predictive data driven model using some assumptions and/or input parameters that are predetermined, e.g., by user 102, an algorithm, or historical information. In some embodiments, define model task 204 may also utilize some initial data, such as baseline workload data sets 202, for establishing initial decision trees or predictive logic.

Train model task 206 may involve training or modifying a predictive data model associated with performing cluster analysis. In some embodiments, train model task 206 may involve changing a predictive data driven model using by adjusting assumptions and/or input parameters using workload data sets 202. For example, during train model task 206, workload data sets 202 may include test or training data that can be analyzed for various patterns, rules, and/or clustering behaviors. In this example, as more workload data sets 202 are analyzed, machine-learning engine 200 may hone or improve a predictive data model for assigning workloads into workload clusters.

Apply model task 208 may involve applying or utilizing a predictive data model associated with performing cluster analysis. In some embodiments, apply model task 208 may involve receiving workload data sets 202 (e.g., workload related characteristics or related information) related to a set of unclustered workloads and using a predictive data model to assign the workloads to workload clusters. For example, during apply model task 208, workload data sets 202 may include workload related characteristics for active workloads in computer system 106. In this example, machine-learning engine 200 may use a predictive data model for assigning these active workloads into workload clusters.

Verify model task 210 may involve verifying a predictive data model associated with performing cluster analysis. In some embodiments, verify model task 210 may involve internal evaluation and/or external evaluation. Internal evaluation may involve analyzing the workloads clustered or their related characteristics when evaluating a predictive data model or a related machine-learning algorithm. External evaluation may involve analyzing data that was not used for workload clustering, such as external benchmarks or user-selected clustering of some same set of workloads. For example, during verify model task 210, external evaluation may involve receiving information indicating appropriate user-selected cluster assignments for a set of workload already assigned by machine-learning engine 200 and determining, using user-selected cluster assignments, whether a predictive data model is accurate enough or needs further training. In another example, during verify model task 210, machine-learning engine 200 may analyze content, services, and/or functions performed by workloads in a same cluster for determining whether a predictive data model or a related machine-learning algorithm is generating appropriate clustering output 212.

Clustering output 212 may represent information outputted when using a predictive data model associated with performing cluster analysis. For example, workload data sets 202 indicating workload related characteristics for a set of workloads may be used by machine-learning engine 200 and/or a predictive data model therein and clustering output 212 may include a list of workload clusters and their associated workloads.

In some embodiments, various machine-learning tasks may be performed repeatedly. For example, iterations of train model task 206, apply model task 208, and verify model task 210 may be performed before machine-learning engine 200 and/or a predictive data model therein is capable of identifying appropriate workload clusters. In this example, multiple factors, including time, training data, and/or user preferences, may be used when determining whether to continue training machine-learning engine 200 and/or a predictive data model therein.

It will be appreciated that FIG. 2 is for illustrative purposes and that additional and/or different machine-learning tasks than those depicted in FIG. 2 can be usable for machine-learning and/or related techniques.

Figure 3:
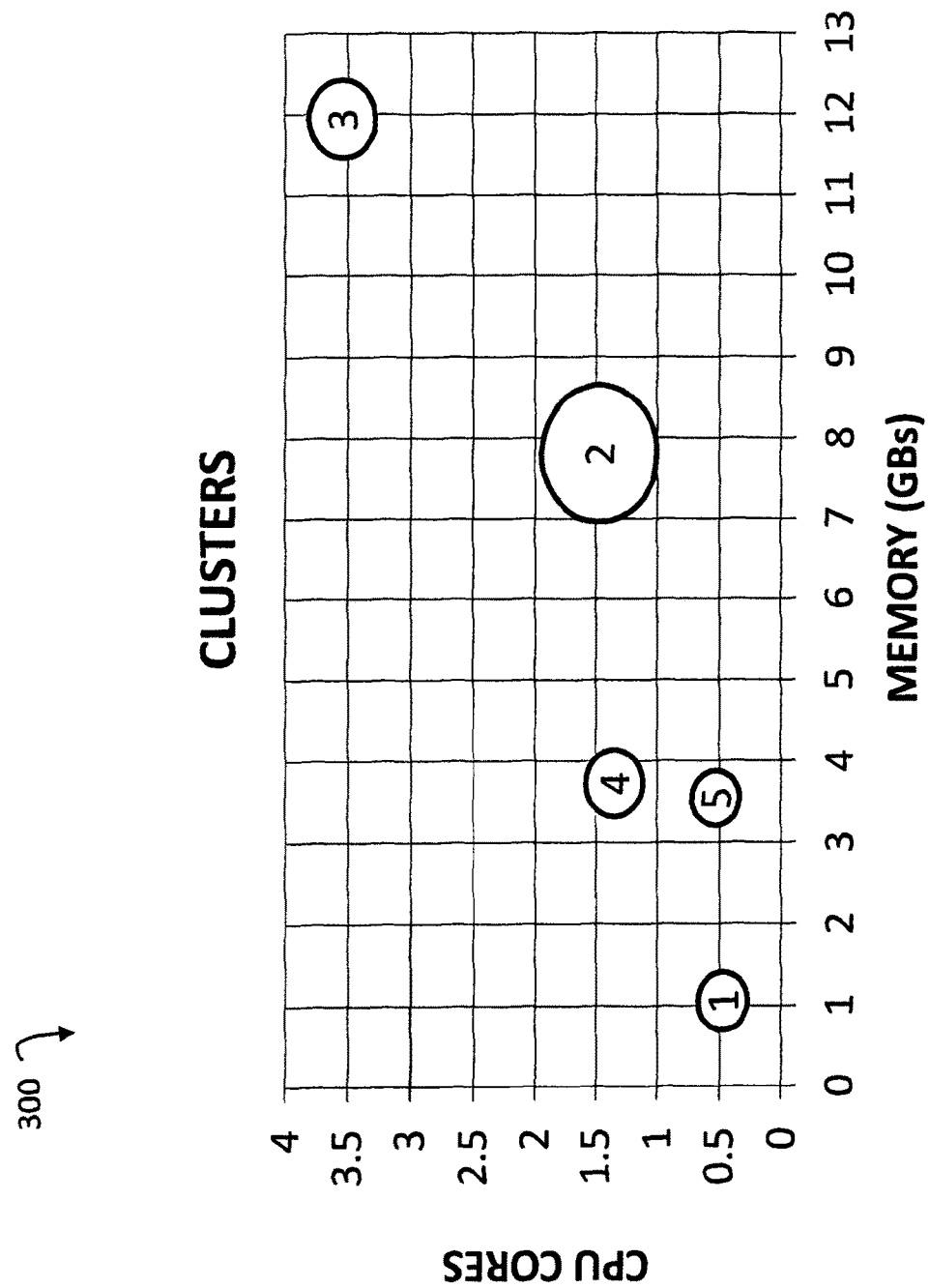
FIG. 3 is a diagram illustrating workload clusters according to an embodiment of the subject matter described herein.

FIG. 3 is a diagram 300 illustrating workload clusters according to an embodiment of the subject matter described herein. In some embodiments, workloads may be clustered based on workload related characteristics. For example, a k-means clustering algorithm may cluster a number of workloads into k number of clusters. In this example, the k-means clustering algorithm may utilize a set of workload characteristics, CPU cores, an OS type, and/or GBs of memory, for identifying workload clusters.

In some embodiments, machine-learning engine 200 may perform workload clustering by representing workloads and related workload clusters in two-dimensional (2-D) Euclidean space. For example, workload clusters in diagram 300 may be represented as circles with numbers therein representing cluster identifiers. The center or centroid of each circle may represent the mean of the cluster. Each centroid may also represent a mean or an average set of workload related characteristics for workloads associated within a same workload cluster. For example, workload cluster '1' may include workloads that generally are allocated or use 1 GB of memory and 0.4 CPU cores, workload cluster '2' may include workloads that generally are allocated or use 3.5 GBs of memory and 0.5 CPU cores, workload cluster '3' may include workloads that generally are allocated or use 3.8 GBs of memory and 1.25 CPU cores, workload cluster '4' may include workloads that generally are allocated or use 7.9 GBs of memory and 1.4 CPU cores, and workload cluster '5' may include workloads that generally are allocated or use 12 GBs of memory and 3.5 CPU cores.

In some embodiments, each workload may be represented as a point in Euclidean space based on its workload related characteristics. For example, assuming diagram 300 represents 2-D Euclidean space, each workload may be represented based on its CPU cores utilized (e.g., 'X' coordinate) and its GBs of memory (e.g., 'Y' coordinate).

In some embodiments, machine-learning engine 200 may perform workload clustering using a k-means cluster algorithm involving an initialization step, an assignment step, and a realignment step. For example, where k=5, an initialization step may include identifying five cluster means or points, where the five cluster means represent an initial location for the five clusters. In this example, the location of the five cluster means may be random, predetermined, or based on a variety of factors, including variance of workload related characteristics.

An assignment step may involve associating each workload with the nearest cluster means. For instance, assuming a cluster mean for workload cluster '2' is (8, 1.5), a workload allocated with eight GBs of memory and two CPU cores may be associated with workload cluster '2'. In another example, assuming a cluster mean for workload cluster '3' is (12, 3.5), a workload allocated with 11 GBs of memory and three CPU cores may be associated with workload cluster '3'.

A realignment step may involve determining a new centroid for a cluster based on the associated workloads coordinates, where the centroid becomes the new cluster mean for the cluster. The assignment step and the realignment step may be repeated until convergence occurs or until a threshold (e.g., a time limit) is reached.

The size of each circle in diagram 300 may represent a relative number of workloads associated with each workload cluster. For example, workload clusters '1' and '5' may be represent workload clusters with relatively small numbers of workloads, workload clusters '3' and '4' may be represent workload clusters with moderate numbers of workloads, and workload cluster '2' may be represent a workload cluster with a relatively large number of workloads.

It will be appreciated that FIG. 3 is for illustrative purposes and that additional and/or different workload related characteristics than those depicted in FIG. 3 can be usable for workload clustering. For example, machine-learning engine 200 may perform workload clustering by representing workloads and related workload clusters in three-dimensional (3-D) Euclidean space. In this example, an 'X' coordinate may represent a number of CPU cores, a 'Y' coordinate may represent GBs of memory, and a 'Z' coordinate may represent an OS type.

Figure 4:
FIG. 4 is a diagram illustrating workload cluster content according to an embodiment of the subject matter described herein.

FIG. 4 is a diagram illustrating workload cluster information 400 according to an embodiment of the subject matter described herein. Workload cluster information 400 may indicate which workloads in a given workload cluster are associated with particular services, functions, and/or content, e.g., web services, database services, VM management services, and remote services (e.g., remote desktop services).

In some embodiments, workload cluster information 400 can be obtained, deleted, modified, and/or provided via one or more communications interfaces. For example, workload cluster information 400 may be determined via system manager 108 querying various hardware and software components via a REST API. In another example, system manager 108 or cluster manager 110 may access VM and/or workload related information stored locally (e.g., in storages 112-116) to derive or obtain workload cluster information 400.

In some embodiments, workload cluster information 400 can be accessible to cluster manager 110, machine-learning engine 200, and/or other entities, e.g., system manager 108. For example, after using a machine-learning engine 200 and/or a machine-learning algorithm, cluster manager 110 may examine or analyze workload cluster information 400 to determine whether an identified workload cluster is efficient and/or whether additional or fewer workload clusters may be utilized for a given set of workloads. In this example, cluster manager 110 may use workload cluster information 400 when determining whether to keep and utilize workload clusters or to redo workload clustering.

In some embodiments, workload cluster information 400 may be usable for verifying workload clusters identified by machine-learning engine 200 or a machine-learning algorithm. For example, workload cluster information 400 may be used for verifying identified workload clusters and/or related assignments to those clusters. In this example, cluster manager 110 may audit content associated each workload cluster and, if the content and/or services associated with workloads in a given workload cluster are too varied or disparate, cluster manager 110 may not allow cluster management via one or more identified workload cluster/s. In another example, if workload clusters are determined to be inefficient for management (e.g., because of varied content or services), cluster manager 110 may reassign workloads to different and/or additional clusters using machine-learning engine 200 and/or one or more machine-learning algorithms.

Referring to FIG. 4, workload cluster information 400 can comprise associations between a cluster identifier and various services that workloads in a related workload cluster may perform. For example, a table representing workload cluster information 400 can comprise columns and/or fields for a cluster identifier, a web services, a database services, a VM management services, and a remote service. In this example, the table may indicate how many workloads in a given workload cluster perform particular types of services.

A cluster identifier field can comprise a name, a value, and/or other information for identifying a workload cluster. For example, a cluster identifier may include a unique number or name, such as '1', '2', or '3'.

A web services field can comprise a value or other information for indicating a number of workloads that perform web services or related functionality. For example, workload cluster information 400 may indicate that a workload cluster (e.g., indicated by identifier '1') is associated with one workload that performs web services. In another example, workload cluster information 400 may indicate that a workload cluster (e.g., indicated by identifier '2') is associated with 164 workloads that perform web services.

A database services field can comprise a value or other information for indicating a number of workloads that perform database services or related functionality. For example, workload cluster information 400 may indicate that a workload cluster (e.g., indicated by identifier '1') is associated with one workload that performs database services. In another example, workload cluster information 400 may indicate that a workload cluster (e.g., indicated by identifier '3') is associated with 56 workloads that perform database services.

A VM management services field can comprise a value or other information for indicating a number of workloads that perform VM management services or related functionality. For example, workload cluster information 400 may indicate that a workload cluster (e.g., indicated by identifier '1') is associated with 14 workloads that perform VM management services. In another example, workload cluster information 400 may indicate that a workload cluster (e.g., indicated by identifier '2') is associated with two workloads that perform VM management services.

A remote services field can comprise a value or other information for indicating a number of workloads that perform remote services or related functionality. For example, workload cluster information 400 may indicate that a workload cluster (e.g., indicated by identifier '1') is associated with zero workloads that perform remote services. In another example, workload cluster information 400 may indicate that a workload cluster (e.g., indicated by identifier '2') is associated with 14 workloads that perform remote services.

It will be appreciated that workload cluster information 400 is illustrative and that additional and/or different information can be used for various aspects of workload clustering and/or cluster management.

Figure 5:
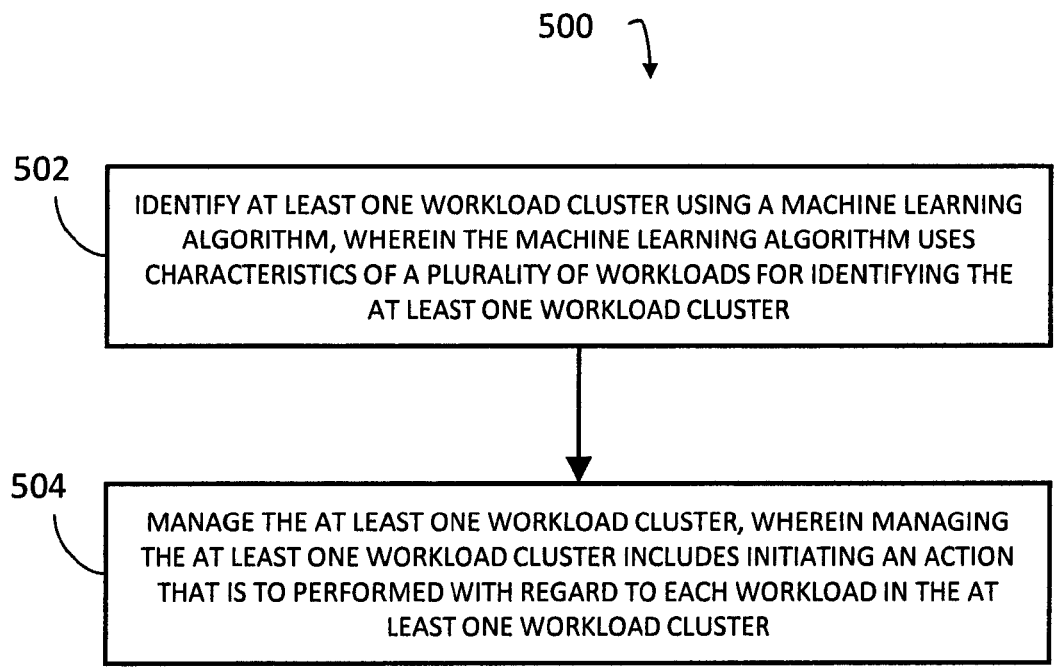
FIG. 5 is a diagram illustrating a method for workload clustering according to an embodiment of the subject matter described herein.

FIG. 5 is a diagram illustrating a method 500 for workload clustering according to an embodiment of the subject matter described herein. In some embodiments, method 500 or portions therein (e.g., step 502 and/or step 504) can include actions or operations performed by computer system 106, system manager 108, cluster manager 110, and/or other module(s) or node(s) (e.g., one or more servers or computers containing one or more processors and memory). For example, cluster manager 110, machine-learning engine 200, or a clustering algorithm implemented using at least one physical computer may perform method 500 or portions therein. For illustrative purposes and explanation, references to entities included in FIGS. 1-4 may be used below.

Referring to method 500, in step 502, at least one workload cluster may be identified using a machine-learning algorithm. For example, the machine-learning algorithm may use characteristics of a plurality of workloads for identifying the at least one workload cluster. In this example, cluster manager 110 may execute the machine-learning algorithm multiple times with various initialization variables, e.g., an initial number of clusters (e.g., value of k in k-means clustering) and initial locations for the cluster (e.g., initial means in k-means clustering).

In some embodiments, a machine-learning algorithm may use a predictive data model based on historical workload information, wherein the historical workload information includes characteristics of a workload and an appropriate workload cluster assignment for the workload. For example, cluster manager 110 may use historical workload information based on previous workload cluster assignments (e.g., assigned by user 102) to generate and/or train machine-learning engine 200 for performing workload clustering.

In some embodiments, a machine-learning algorithm may include a k-means clustering algorithm. For example, a k-means clustering algorithm may involve a form of vector quantification and may cluster or group a number of workloads into a k number of clusters.

In some embodiments, a k-means clustering algorithm may use characteristics of a plurality of workloads to identify a k number of workload clusters. For example, characteristics, such as CPU cores, memory usage, and/or OS type, for a plurality of workloads associated with computer system 106 may be used in identifying k number of clusters.

In some embodiments, a k-means clustering algorithm may be executed multiple times using different values for k.

For example, cluster manager 110 may execute a k-means clustering algorithm multiple times, where each time cluster manager 110 attempts to group workloads into a different number of workload clusters (e.g., k=1, 2, . . . , 100). In this example, cluster manager 110 may stop (re)executing a k-means clustering algorithm when a time limit is reached or other metrics are achieved (e.g., a threshold value associated with the variance between two executions of a k-means clustering algorithm is not met).

In some embodiments, characteristics of the plurality of workloads may include at least one of a group comprising information about a number of processing cores utilized, information about memory utilized, and information about an operating system utilized. For example, each workload may be represented as a point in Euclidean space based on its workload related characteristics. In this example, using a k-means clustering algorithm or another clustering algorithm, cluster manager 110 may determine which workloads should be grouped or clustered based on the proximity of some workloads to each other as represented by their positions in Euclidean space.

In step 504, the at least one workload cluster may be managed. For example, managing at least one workload cluster may include initiating an action that is to performed with regard to each workload in the at least one workload cluster. In this example, managing at least one workload cluster may include starting a VM, stopping a VM, pausing a VM, and/or moving a VM.

It will be appreciated that FIG. 5 is for illustrative purposes and that additional and/or different steps than those depicted in FIG. 5 can be usable for workload clustering and/or workload cluster management. Additionally, it will be appreciated that steps depicted in FIG. 5 can occur in a different order than depicted in FIG. 5 or that some steps depicted in FIG. 5 may be performed concurrently.

It should be noted that computer system 106, system manager 108, cluster manager 110, and/or functionality described herein can constitute a special purpose computing system. Further, computer system 106, system manager 108, cluster manager 110, and/or functionality described herein can improve the technological field of distributed computer systems by using one or more machine-learning algorithms to group workloads into workload clusters. For example, a machine-learning algorithm may use a predictive data model that is trained by historical workload information to identify appropriate workload clusters. Further, computer system 106, system manager 108, cluster manager 110, and/or functionality described herein can improve the technological field of distributed computer systems by optimizing workload management and/or VM configuration. For example, by using workload clusters and/or one or more machine-learning algorithms for clustering purposes, workload management, VM configuration, and/or other related tasks may be performed more quickly and more efficiently than other management techniques.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, including all such variations, modifications and alternative embodiments, within its scope and including equivalents of the claims. It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method comprising:
    identifying at least one workload cluster using a machine-learning algorithm, wherein the machine-learning algorithm uses characteristics of a plurality of workloads for identifying the at least one workload cluster, wherein each of the plurality of workloads includes a virtual machine (VM), wherein the characteristics of a plurality of workloads used by the machine-learning algorithm for identifying the at least one workload cluster include one or more operating system (OS) types associated with the VMs of the plurality of workloads, wherein the machine-learning algorithm uses a k-means clustering algorithm to identify a first workload cluster including VMs using at least some similar resources and executing a first OS and a second workload cluster including VMs using at least some similar resources and executing a second OS, wherein the k-means clustering algorithm analyzes the workloads by representing the workloads in Euclidean space, wherein a first Euclidean space coordinate associated with a first workload is based on a number of processing cores utilized by the first workload, a second Euclidean space coordinate associated with the first workload is based on an amount of random access memory utilized by the first workload, and a third Euclidean space coordinate associated with the first workload is based on an OS type associated with the first workload;
    providing a customized user interface that includes relevant workload operations based on the at least one workload cluster; and
    managing workloads of the at least one workload cluster, wherein managing the workloads of the at least one workload cluster includes initiating an action that is to be performed with regard to each workload in the at least one workload cluster.

2. The method of claim 1 wherein the k-means clustering algorithm uses the characteristics of the plurality of workloads to identify k number of workload clusters.

3. The method of claim 2 wherein the k-means clustering algorithm is executed multiple times using different values for k.

4. The method of claim 1 wherein managing the workloads of the at least one workload cluster includes at least one of a group comprising starting a VM, stopping a VM, pausing a VM, and moving a VM.

5. The method of claim 1 wherein the machine-learning algorithm uses a predictive data model based on historical workload information, wherein the historical workload information includes characteristics of a workload and an appropriate workload cluster assignment for the workload.

6. A system comprising:
    at least one physical computer; and
    a cluster manager implemented using the at least one physical computer for performing workload operations comprising:
        identifying at least one workload cluster using a machine-learning algorithm, wherein the machine-learning algorithm uses characteristics of a plurality of workloads for identifying the at least one workload cluster, wherein each of the plurality of workloads includes a virtual machine (VM), wherein the characteristics of a plurality of workloads used by the machine-learning algorithm for identifying the at least one workload cluster include one or more operating system (OS) types associated with the VMs of the plurality of workloads, wherein the machine-learning algorithm uses a k-means clustering algorithm to identify a first workload cluster including VMs using at least some similar resources and executing a first OS and a second workload cluster including VMs using at least some similar resources and executing a second OS, wherein the k-means clustering algorithm analyzes the workloads by representing the workloads in Euclidean space, wherein a first Euclidean space coordinate associated with a first workload is based on a number of processing cores utilized by the first workload, a second Euclidean space coordinate associated with the first workload is based on an amount of random access memory utilized by the first workload, and a third Euclidean space coordinate associated with the first workload is based on an OS type associated with the first workload;

providing a customized user interface that includes relevant workload operations based on the at least one workload cluster; and managing workloads of the at least one workload cluster, wherein managing the workloads of the at least one workload cluster includes initiating an action that is to be performed with regard to each workload in the at least one workload cluster.

7. The system of claim 6 wherein the k-means clustering algorithm uses the characteristics of the plurality of workloads to identify k number of workload clusters.

8. The system of claim 7 wherein the k-means clustering algorithm is executed multiple times using different values for k.

9. The system of claim 6 wherein managing the workloads of the at least one workload cluster includes at least one of a group comprising starting a virtual VM, stopping a VM, pausing a VM, and moving a VM.

10. The system of claim 6 wherein the machine-learning algorithm uses a predictive data model based on historical workload information, wherein the historical workload information includes characteristics of a workload and an appropriate workload cluster assignment for the workload.

11. A non-transitory computer readable medium having stored thereon executable instructions which, when executed by at least one physical computer, cause the at least one physical computer to perform workload operations comprising:

identifying at least one workload cluster using a machine-learning algorithm, wherein the machine-learning algorithm uses characteristics of a plurality of workloads for identifying the at least one workload cluster, wherein each of the plurality of workloads includes a virtual machine (VM), wherein the characteristics of a plurality of workloads used by the machine-learning algorithm for identifying the at least one workload cluster include one or more operating system (OS) types associated with the VMs of the plurality of workloads, wherein the machine-learning algorithm uses a k-means clustering algorithm to identify a first workload cluster including VMs using at least some similar resources and executing a first OS and a second workload cluster including VMs using at least some similar resources and executing a second OS, wherein the k-means clustering algorithm analyzes the workloads by representing the workloads in Euclidean space, wherein a first Euclidean space coordinate associated with a first workload is based on a number of processing cores utilized by the first workload, a second Euclidean space coordinate associated with the first workload is based on an amount of random access memory utilized by the first workload, and a third Euclidean space coordinate associated with the first workload is based on an OS type associated with the first workload;

providing a customized user interface that includes relevant workload operations based on the at least one workload cluster; and managing workloads of the at least one workload cluster, wherein managing the workloads of the at least one workload cluster includes initiating an action that is to be performed with regard to each workload in the at least one workload cluster.

12. The non-transitory computer readable medium of claim 11 wherein the k-means clustering algorithm uses the characteristics of the plurality of workloads to identify k number of workload clusters.

13. The non-transitory computer readable medium of claim 12 wherein the k-means clustering algorithm is executed multiple times using different values for k.

14. The non-transitory computer readable medium of claim 11 wherein managing the workloads of the at least one workload cluster includes at least one of a group comprising starting a VM, stopping a VM, pausing a VM, and moving a VM.

* * * * *